US012623812B2

(12) United States Patent
Nowak

(10) Patent No.: US 12,623,812 B2
(45) Date of Patent: May 12, 2026

(54) DIVIDER CONSTRUCT FOR CONTAINERS, RELATED SYSTEMS AND METHODS

(71) Applicant: Graphic Packaging International, LLC, Atlanta, GA (US)

(72) Inventor: Lee Nowak, Leicestershire (GB)

(73) Assignee: Graphic Packaging International, LLC, Atlanta, GA (US)

( * ) Notice: Subject to any disclaimer, the term of this patent is extended or adjusted under 35 U.S.C. 154(b) by 46 days.

(21) Appl. No.: 18/609,496

(22) Filed: Mar. 19, 2024

(65) Prior Publication Data

US 2024/0317459 A1 Sep. 26, 2024

Related U.S. Application Data

(60) Provisional application No. 63/453,602, filed on Mar. 21, 2023.

(51) Int. Cl.

| | |
|---|---|
| ***B65D 25/04*** | (2006.01) |
| ***B31B 50/26*** | (2017.01) |
| ***B65D 5/49*** | (2006.01) |
| *B31B 120/25* | (2017.01) |

(52) U.S. Cl.

CPC ............ *B65D 25/04* (2013.01); *B31B 50/262* (2017.08); *B65D 5/48024* (2013.01); *B65D 5/48034* (2013.01); *B31B 2120/25* (2017.08)

(58) Field of Classification Search

CPC ...... B65D 25/04; B65D 5/48; B65D 5/48024; B65D 5/48028; B65D 5/48032; B65D 5/48034; B31B 50/262; B31B 2120/25

USPC ............................ 229/120.23; 220/500, 528

See application file for complete search history.

(56) References Cited

U.S. PATENT DOCUMENTS

| | | | | |
|---|---|---|---|---|
| 2,894,672 | A * | 7/1959 | Bamburg ............. | B65D 5/0035 229/172 |
| 3,014,632 | A * | 12/1961 | Kuchenbecker ... | B65D 5/48034 229/120.26 |
| 3,721,380 | A | 3/1973 | Meyers | |
| 3,980,223 | A | 9/1976 | Curran | |
| 4,030,660 | A | 6/1977 | Rada et al. | |
| 4,089,457 | A | 5/1978 | Wood et al. | |
| 4,157,156 | A | 6/1979 | Skaggs | |
| 4,227,641 | A | 10/1980 | Gardner | |

(Continued)

FOREIGN PATENT DOCUMENTS

| | | |
|---|---|---|
| DE | 2020 20101091 | 5/2021 |
| JP | 06-156480 A | 6/1994 |

(Continued)

OTHER PUBLICATIONS

International Search Report and Written Opinion for PCT/US2024/020539 dated Jul. 9, 2024.

*Primary Examiner* — Don M Anderson
*Assistant Examiner* — Jennifer Castriotta
(74) *Attorney, Agent, or Firm* — Andrew N. Claerbout; FisherBroyles, LLP

(57) ABSTRACT

A construct for providing divider features in the interior of a container includes a plurality of panels including a bottom panel, at least one hinge panel foldably connected to the bottom panel, and at least one divider panel foldably connected to the at least one hinge panel, and divider features including at least one divider wall extending upwardly from the bottom panel and comprising the at least one divider panel.

35 Claims, 5 Drawing Sheets

(56) References Cited

U.S. PATENT DOCUMENTS

| | | | |
|---|---|---|---|
| 4,333,600 | A | 6/1982 | Gardner |
| 4,417,684 | A | 11/1983 | Skaggs |
| 5,476,217 | A | 12/1995 | Moncrief |
| 5,529,240 | A | 6/1996 | Harris |
| 6,112,977 | A | 9/2000 | Sutherland et al. |
| 7,168,558 | B2 | 1/2007 | Harrelson |
| 7,240,789 | B2 | 7/2007 | Sutherland |
| 7,994,456 | B2 | 8/2011 | Ford et al. |
| 8,376,214 | B2 | 2/2013 | Spivey, Sr. |
| 8,459,535 | B2 | 6/2013 | Brand |
| 8,628,000 | B2 | 1/2014 | Spivey, Sr. |
| 8,978,889 | B2 | 3/2015 | Fitzwater et al. |
| 9,022,217 | B2 | 5/2015 | Holley, Jr. |
| 9,205,939 | B2 | 12/2015 | Disrud et al. |
| 9,233,769 | B2 | 1/2016 | Disrud et al. |
| 9,284,084 | B2 | 3/2016 | Schmal et al. |
| 9,352,890 | B2 | 5/2016 | Alexander |
| 9,487,320 | B2 | 11/2016 | Holley, Jr. |
| 9,701,436 | B2 | 7/2017 | Holley, Jr. |
| 9,708,112 | B2 | 7/2017 | Sutherland et al. |
| 9,840,358 | B2 | 12/2017 | Oliveira |
| 10,077,131 | B2 | 9/2018 | Lettre et al. |
| 10,106,291 | B2 | 10/2018 | Kearns |
| 10,501,226 | B2 | 12/2019 | Spivey, Sr. |
| 10,543,969 | B2 | 1/2020 | Gonzalez et al. |
| 11,059,621 | B2 | 7/2021 | Nowak et al. |
| 11,760,549 | B2 | 9/2023 | Alexander et al. |
| 12,172,814 | B2 | 12/2024 | Smalley |
| 2003/0146269 | A1 | 8/2003 | Auclair et al. |
| 2004/0195116 | A1 | 10/2004 | Leung |
| 2008/0290147 | A1 | 11/2008 | Skolik et al. |
| 2010/0084309 | A1 | 4/2010 | Sielski |
| 2014/0158694 | A1 | 6/2014 | Martin |
| 2017/0144829 | A1 | 5/2017 | Muhammad |
| 2023/0365293 | A1 | 11/2023 | Nowak |

FOREIGN PATENT DOCUMENTS

| | | | | | |
|---|---|---|---|---|---|
| JP | 11-227746 | A | | 8/1999 | |
| JP | 2001-048161 | A | | 2/2001 | |
| JP | 2009-078818 | A | | 4/2009 | |
| KR | 20-1990-0015203 | U | | 5/1999 | |
| KR | 10-0393518 | B1 | | 8/2003 | |
| WO | WO-2023220331 | A1 | * | 11/2023 | ........... B65D 5/4801 |
| WO | WO-2024044303 | A1 | * | 2/2024 | ......... B65D 5/48034 |

* cited by examiner

DIVIDER CONSTRUCT FOR CONTAINERS, RELATED SYSTEMS AND METHODS

CROSS-REFERENCE TO RELATED APPLICATION

The present application claims the benefit of U.S. Provisional Patent Application No. 63/453,602, filed on Mar. 21, 2023.

INCORPORATION BY REFERENCE

The disclosure of U.S. Provisional Patent Application No. 63/453,602, filed on Mar. 21, 2023, is hereby incorporated by reference for all purposes as if set forth in its entirety.

BACKGROUND OF THE DISCLOSURE

The present disclosure generally relates to containers for holding at least one article. In one embodiment, the present disclosure relates to constructs for providing divider features in the interior of a container for holding at least one article.

SUMMARY OF THE DISCLOSURE

According to one aspect, the disclosure is generally directed to a construct for providing divider features in the interior of a container, the construct comprising a plurality of panels comprising a bottom panel, at least one hinge panel foldably connected to the bottom panel, and at least one divider panel foldably connected to the at least one hinge panel, and divider features comprising at least one divider wall extending upwardly from the bottom panel and comprising the at least one divider panel.

According to another aspect, the disclosure is generally directed to a blank for forming a construct for providing divider features in the interior of a container, the blank comprising a plurality of panels comprising a bottom panel, at least one hinge panel foldably connected to the bottom panel, and at least one divider panel foldably connected to the at least one hinge panel, and divider features for forming at least one divider wall extending upwardly from the bottom panel when the construct is formed from the blank, the divider features comprising the at least one divider panel.

According to another aspect, the disclosure is generally directed to a method of forming a construct for providing divider features in the interior of a container, the method comprising obtaining a blank, the blank comprising a plurality of panels comprising a bottom panel, at least one hinge panel foldably connected to the bottom panel, and at least one divider panel foldably connected to the at least one hinge panel, and divider features comprising the at least one divider panel. The method further comprises positioning the divider features to form at least one divider wall extending upwardly from the bottom panel.

According to another aspect, the disclosure is generally directed to a system comprising a container comprising a bottom wall and a sidewall extending upwardly from the bottom wall and at least partially around an interior of the container, and a construct for providing divider features in the interior of the container. The construct comprises a plurality of panels comprising a bottom panel, at least one hinge panel foldably connected to the bottom panel, and at least one divider panel foldably connected to the at least one hinge panel, and divider features comprising at least one divider wall extending upwardly from the bottom panel and comprising the at least one divider panel.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

Containers and constructs according to the present disclosure can accommodate articles of numerous different shapes. In this specification, the terms "lower," "bottom," "upper," "top," "front," and "back" indicate orientations determined in relation to fully erected containers. As described herein, containers may be formed by multiple overlapping panels, portions, and/or end flaps. Such panels, portions, and/or end flaps may be designated in relative terms to one another, e.g., "first", "second", "third", etc., in sequential or non-sequential reference, without departing from the disclosure.

Figure 1:
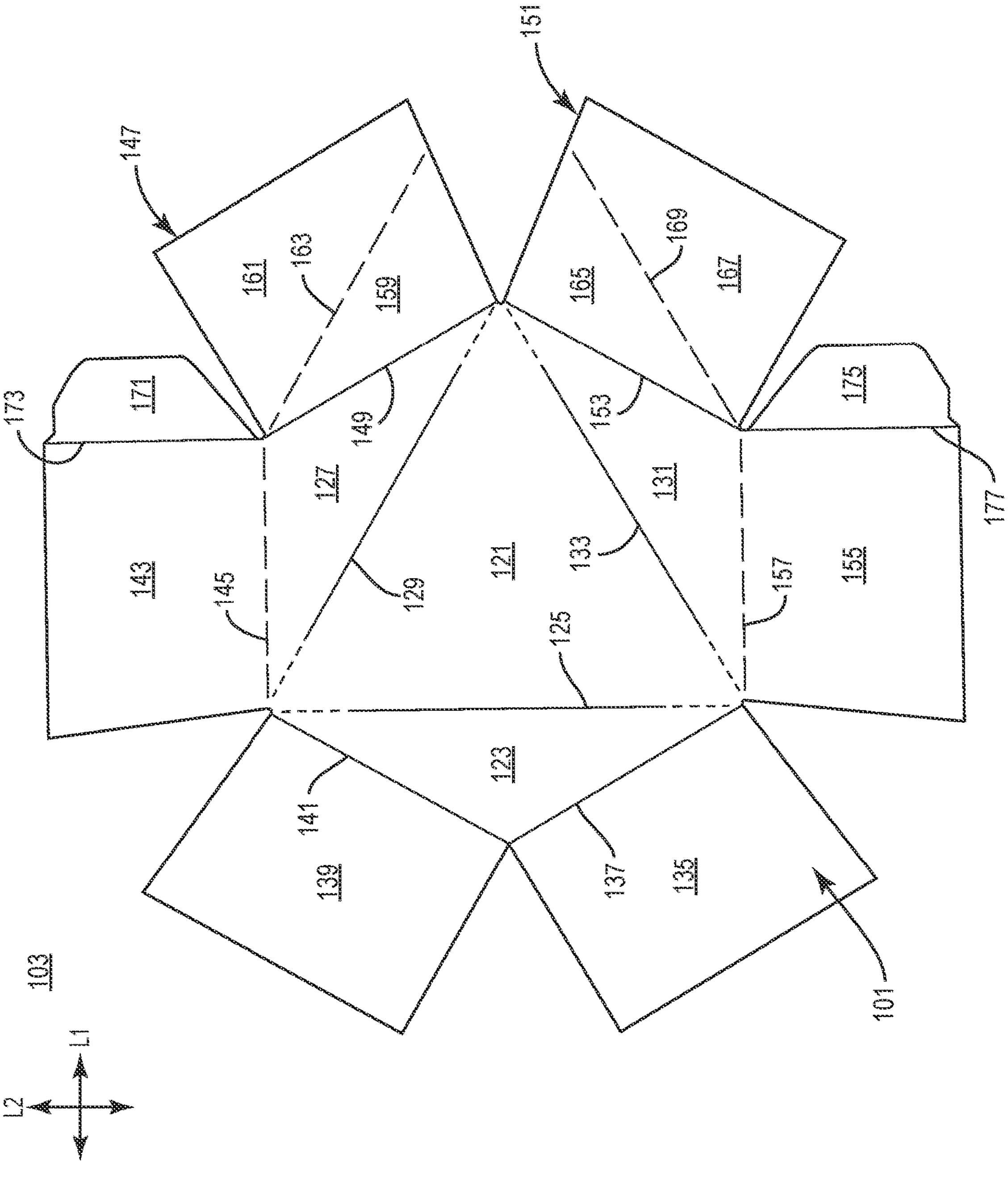
FIG. 1 is a plan view of an exterior surface of a blank for forming a construct according to an exemplary embodiment of the disclosure.

According to an exemplary embodiment of the disclosure, FIG. 1 illustrates an exterior surface 101 of a blank 103 for forming a divider construct or construct 105 (FIG. 4) according to exemplary embodiments of the disclosure. The construct 105 can be configured to form a divider insert, to provide divider features in the interior of another container. In this regard, the construct 105 can be provided together with a container to form a system 110 (FIG. 5).

Figure 5:
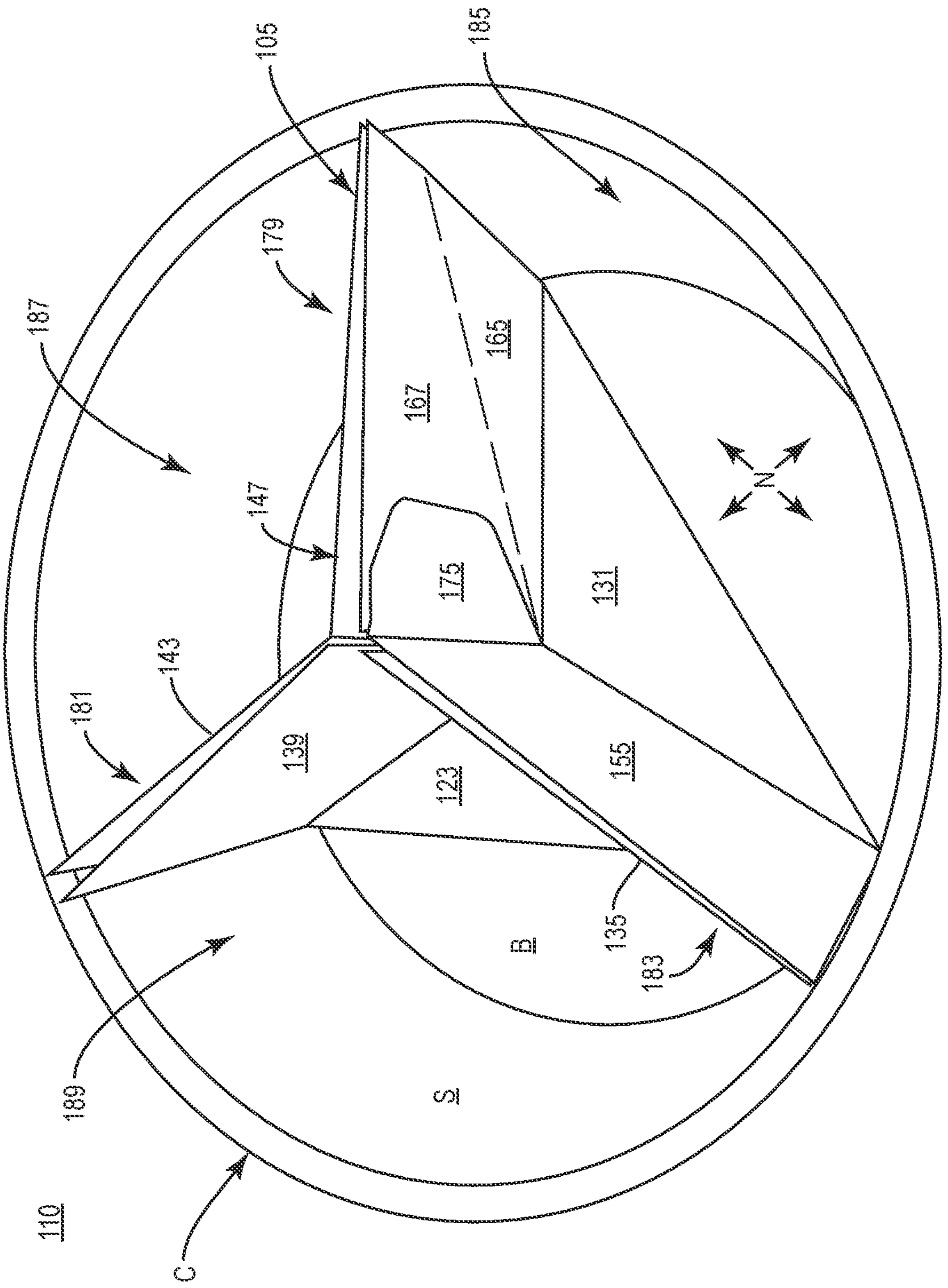
FIG. 5 is a perspective view of a system including a construct formed from the blank of FIG. 1 and a container according to an exemplary embodiment of the disclosure.

With momentary reference to FIG. 5, a container C for use with the construct 105 according to exemplary embodiments of the present disclosure is shown. The container C can include a bottom wall B and a sidewall S extending upwardly from the bottom wall B to define an interior N of the container C. As described further herein, the container C can be provided with the interior N for at least partially holding one or more articles such as food products. In some embodiments, the interior N of the container C can have a volume of about 54 oz, though the interior N of the container C could have a different volume without departing from the disclosure.

While the bottom wall B and the sidewall S can each have a generally circular configuration, with the sidewall S having a profile that tapers downwardly toward a point of attachment to the bottom wall B, it will be understood that the bottom wall B and/or the sidewall S can have a different configuration without departing from the disclosure. It will be understood that one or more of the bottom wall B and sidewall S can be formed from one or more panels and/or end flaps. In some embodiments, the bottom wall B can include a bottom panel having a peripheral edge that can be folded downwardly to form a downwardly, depending leg that is attached to the sidewall S. The sidewall S can be formed from a side panel arranged in a generally circular configuration such that free edges and/or marginal portions of the side panel can be at least partially overlapped at a seam to form the sidewall S.

Containers that can be used to form the system 110, e.g., the container C or another container, can be used for holding one or more articles such as food products, e.g., portioned retail food products that can include one or more of cookies, crackers, cakes, pastries, candies, nuts, popcorn, trail mix, gum, etc. In some embodiments, the articles can include frozen or non-frozen food products that can be provided in discrete portions, for example, chicken nuggets, French fries, onion rings, mozzarella sticks, chips, popcorn, chicken wings, chicken thighs, chicken breasts, other finger foods, etc. In embodiments, other types of articles that can include food products and/or non-food products can be placed in a container for service to a customer, for example, at a quick service restaurant or vendor. In some embodiments, such products can be contained in additional packaging and then placed in a container. Such containers could be otherwise shaped and arranged and could be used to hold other products and/or articles in similar or different environments without departing from the disclosure.

In some embodiments, it may be desirable to provide articles in a container in at least partial separation from one another, e.g., to avoid commingling of different food products, for case of service of use, to more prominently display such different articles to a customer, etc. In this regard, it can be desirable to provide divider features in the container to provide at least partial separation between such articles, as described further herein.

With continued reference to FIG. 1, the blank 103 has a lateral axis L1 and a longitudinal axis L2. The blank 103 can have a plurality of panels that include a central panel or bottom panel 121 with a generally triangular configuration.

A first hinge panel 123 (broadly, "second hinge panel" or "third hinge panel") can be foldably connected to the bottom panel 121 at a lateral fold line 125, a second hinge panel 127 (broadly, "first hinge panel" or "third hinge panel") can be foldably connected to the bottom panel 121 at an oblique fold line 129, and a third hinge panel 131 (broadly, "first hinge panel" or "second hinge panel") can be foldably connected to the bottom panel 121 at an oblique fold line 133.

The plurality of panels of the blank 103 and the construct 105 formed therefrom can also include a divider panel 135 (broadly, "first divider panel" or "second divider panel" or "third divider panel" or "fourth divider panel" or "fifth divider panel" or "sixth divider panel") foldably connected to the hinge panel 123 at an oblique fold line 137, a divider panel 139 (broadly, "first divider panel" or "second divider panel" or "third divider panel" or "fourth divider panel" or "fifth divider panel" or "sixth divider panel") foldably connected to the hinge panel 123 at an oblique fold line 141, a divider panel 143 (broadly, "first divider panel" or "second divider panel" or "third divider panel" or "fourth divider panel" or "fifth divider panel" or "sixth divider panel") foldably connected to the hinge panel 127 at a longitudinal fold line 145, a divider panel 147 (broadly, "first divider panel" or "second divider panel" or "third divider panel" or "fourth divider panel" or "fifth divider panel" or "sixth divider panel") foldably connected to the hinge panel 127 at an oblique fold line 149, a divider panel 151 (broadly, "first divider panel" or "second divider panel" or "third divider panel" or "fourth divider panel" or "fifth divider panel" or "sixth divider panel") foldably connected to the hinge panel 131 at an oblique fold line 153, and a divider panel 155 (broadly, "first divider panel" or "second divider panel" or "third divider panel" or "fourth divider panel" or "fifth divider panel" or "sixth divider panel") foldably connected to the hinge panel 131 at a longitudinal fold line 157.

The divider panel 147, as shown, can include a base portion 159 foldably connected to the hinge panel 127 at the fold line 149, and a distal portion 161 foldably connected to the base portion 159 at an oblique fold line 163. Similarly, the divider panel 151 can include a base portion 165 foldably connected to the hinge panel 131 at the oblique fold line 153, and a distal portion 167 foldably connected to the base portion 165 at an oblique fold line 169.

The blank 103 and the construct 105 formed therefrom can also include a plurality of end flaps foldably connected to a respective panel of the plurality of panels. In the illustrated embodiment, the plurality of end flaps can include an attachment end flap 171 foldably connected to the divider panel 143 at a lateral fold line 173, and an attachment end flap 175 foldably connected to the divider panel 155 at a lateral fold line 177. In some embodiments, one or both of the attachment end flaps 171, 175 can be considered a panel of the plurality of panels of the blank 103 and construct 105 formed therefrom. In some embodiments, one or both of the attachment end flaps 171, 175 can be considered a portion of the respective divider panels 143, 155.

It will be understood that the blank 103 and construct 105 formed therefrom can include a different number, arrangement, and/or configuration of panels, end flaps, and/or associated features without departing from the disclosure. In some embodiments, one or more of the fold lines 125, 129, 133, 137, 141, 145, 149, 153, 157, 163, 169, 173, 177 can be lines of weakening that include one or more tear segments.

With additional reference to FIGS. 2-4, formation of the construct 105 from the blank 103 will be described according to an exemplary embodiment of the disclosure. It will be understood that intermediate configurations between the blank 103 illustrated in FIG. 1 and the construct 105 illustrated in FIG. 4 can optionally be considered a further folded configuration of the blank 103 or a partially erected configuration of the construct 105.

The blank 103 can be positioned with the exterior surface 101 facing downwardly on a supporting surface and with an interior surface 102 of the blank 103 facing upwardly. The divider panels 155, 143 can be folded at the respective fold lines 157, 145 and the distal portions 167, 161 of the respective divider panels 151, 147 can be folded at the respective fold lines 169, 163 such that the end flaps 175, 171 carried with the respective divider panels 155, 143 are positioned in at least partial face-to-face contact with the interior surface of the respective distal portions 167, 161 of the respective divider panels 151, 147.

In some embodiments, the divider panels 155, 151 can be at least partially folded at the respective fold lines 157, 153 into at least partially upright relation with respect to the hinge panel 127, and the divider panels 143, 147 can be at least partially folded at the respective fold lines 145, 149 into at least partially upright relation with respect to the hinge panel 127.

The hinge panels 127, 131 can be folded at the respective fold lines 129, 133 in the direction of the respective arrows A1, A2 such that the exterior surfaces thereof are positioned in at least partial face-to-face contact with respective portions of the exterior surface of the bottom panel 121. The divider panels 147, 151 can thus be positioned in at least partial face-to-face contact with one another to form a divider wall 179 (broadly, "first divider wall" or "second divider wall" or "third divider wall").

Figure 2:
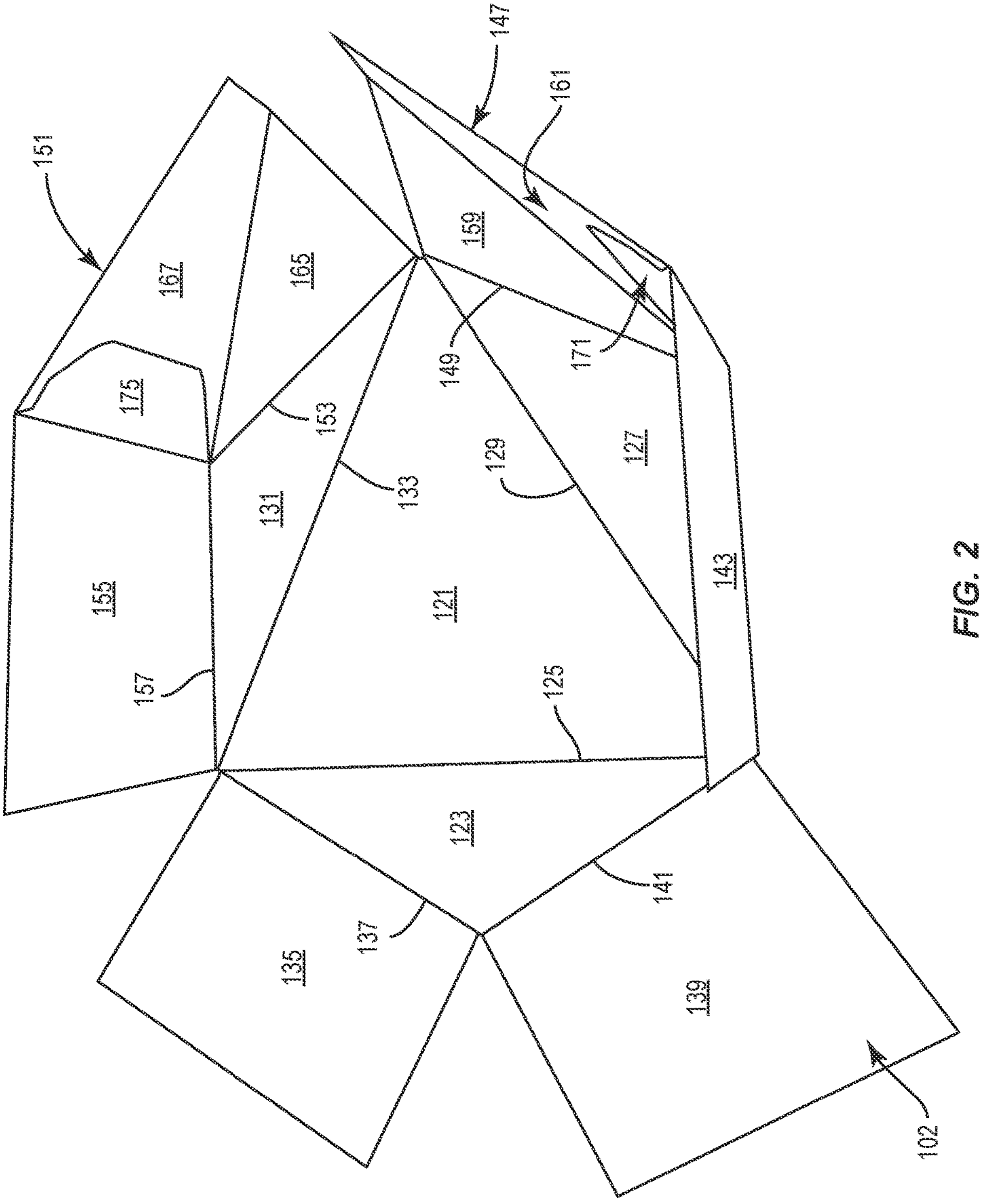
FIGS. 2-4 are sequential perspective views of a formation of a construct from the blank of FIG. 1 according to an exemplary embodiment of the disclosure.
Figure 3:
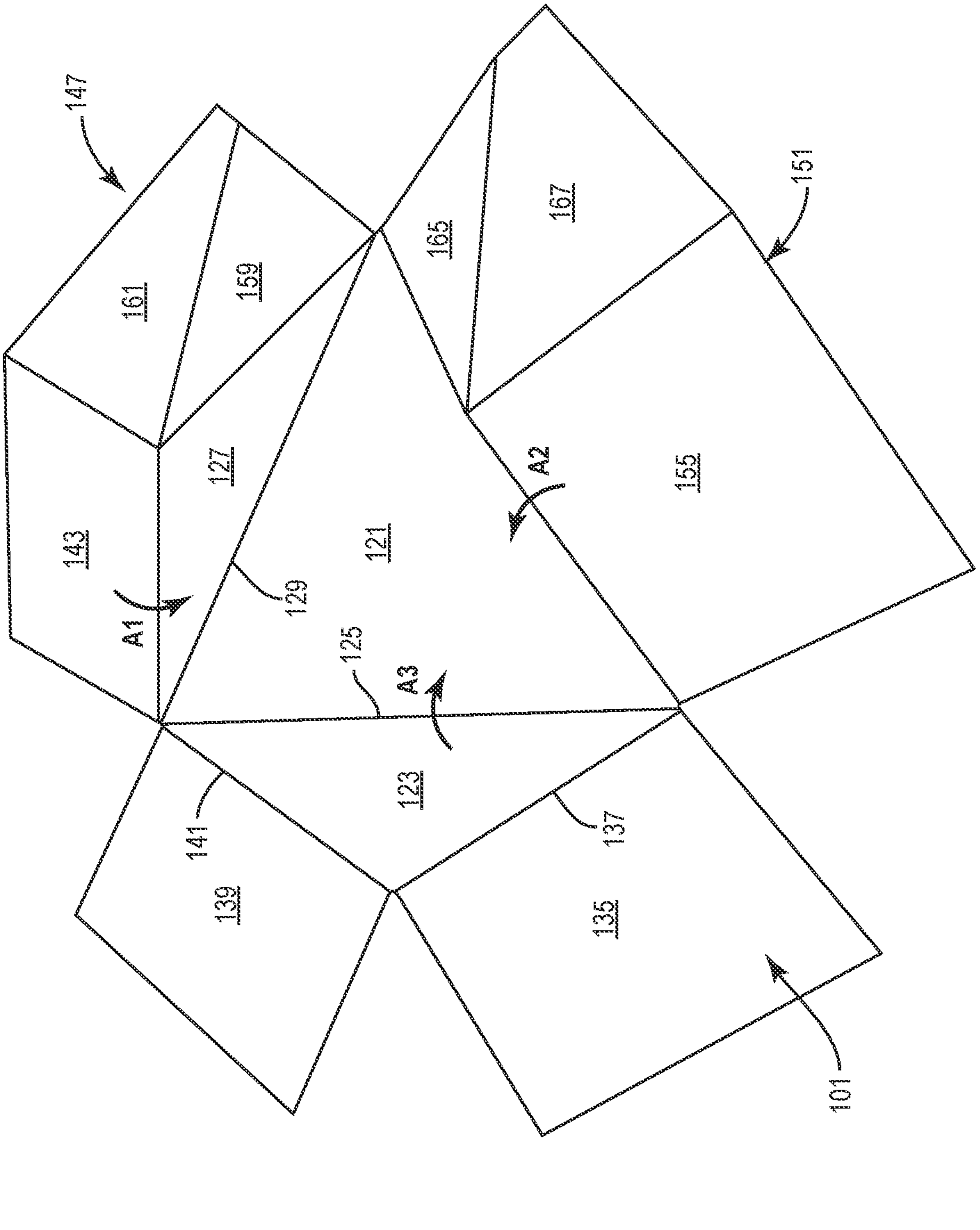
Figure 4:
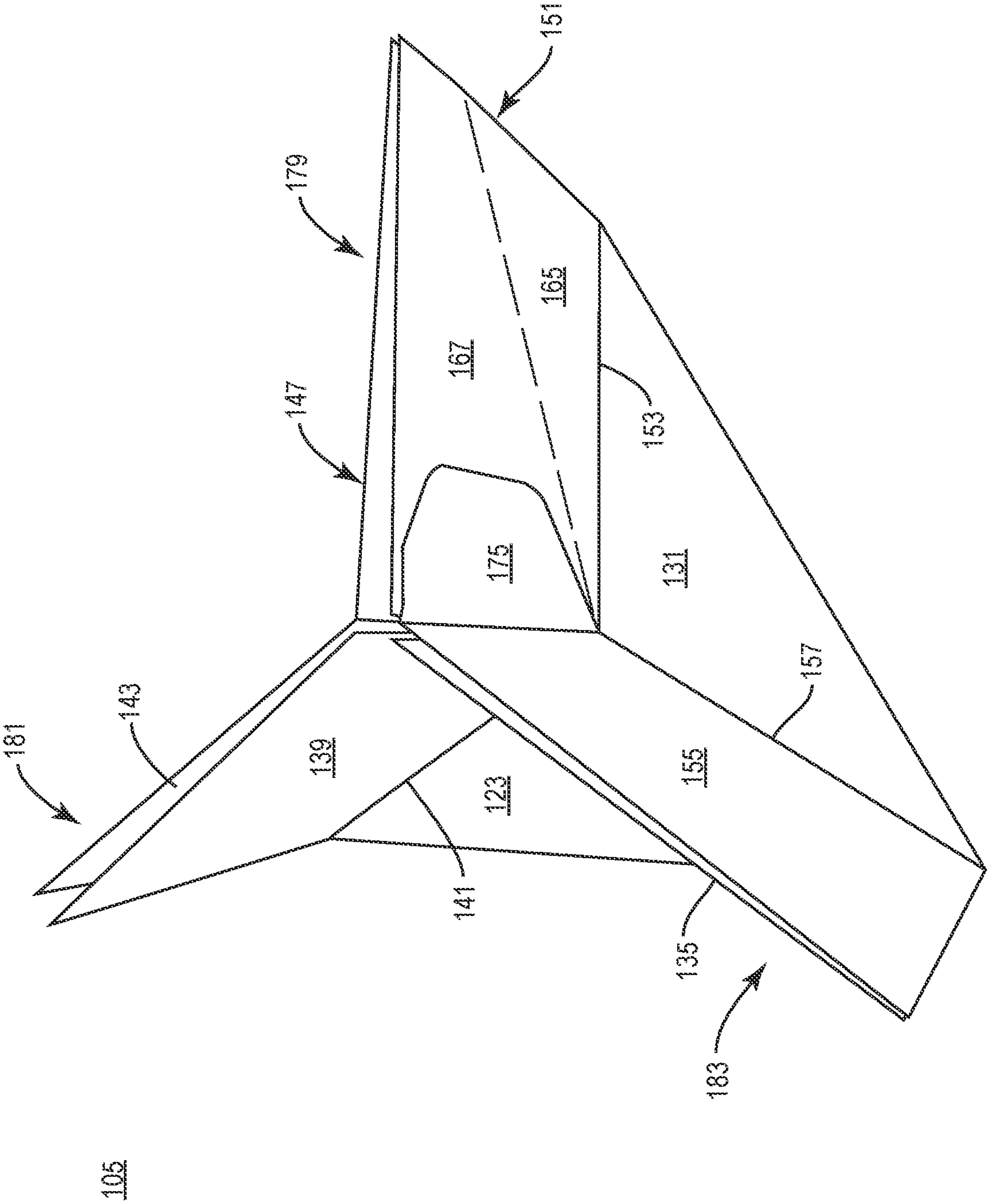

With continued reference to FIGS. 2-4, the hinge panel 123 can be folded at the fold line 125 in the direction of the arrow A3 into at least partial face-to-face contact with a respective portion of the bottom panel 121 and such that the divider panel 139 is positioned in at least partial face-to-face contact with the divider panel 143 to form a divider wall 181 (broadly, "first divider wall" or "second divider wall" or "third divider wall"), and such that the divider panel 135 is positioned in at least partial face-to-face contact with the divider panel 155 to form a divider wall 183 (broadly, "first divider wall" or "second divider wall" or "third divider wall"). Such arrangement can include at least partial folding of the divider panels 135, 139 at the respective fold lines 137, 139 into generally upright relation with respect to the hinge panel 123.

In this regard, the exterior surfaces of the respective divider panels 147, 151 are positioned in at least partial face-to-face contact to form the divider wall 179, the exterior surfaces of the respective divider panels 139, 143 are positioned in at least partial face-to-face contact to form the divider wall 181, and the exterior surfaces of the respective divider panels 135, 155 are positioned in at least partial face-to-face contact to form the divider wall 183.

Such an arrangement of the construct 105 can be at least partially maintained with one or more applications of an adhesive such as glue. In one embodiment, one or more applications of adhesive can be provided on the exterior surfaces of the respective attachment end flaps 171, 175 such that the attachment end flaps 171, 175 can be adhered to respective interior surfaces of the respective divider panels 147, 151.

The divider wall 181 can thus be attached to the divider wall 179 via the attachment end flap 171, and the divider wall 173 can be attached to the divider wall 179 via the attachment end flap 175.

The aforementioned arrangement of the construct 105, as shown in FIG. 4, can be configured as a divider insert that provides divider features for another container such as the container C. As described herein, the divider features of the construct 105 can include a plurality of divider walls extending upwardly from the bottom panel 121.

With additional reference to FIG. 5, the construct 105 can be at least partially received in the interior N of the container C to form the system 110. In the system 110, the divider walls 179, 181, 183 are arranged extending upwardly from the bottom wall B of the container C to form a plurality of compartment spaces or compartments 185, 187, 189 therebetween that are each a respective portion of the interior N of the container C, e.g., to provide separated receiving spaces for articles or products in the system 110.

In the illustrated embodiment, the compartment space 185 can be at least partially defined between the divider wall 179, the divider wall 183, the hinge panel 131 and a respective portion of the bottom wall B of the container C, and a respective portion of the sidewall S of the container C. Similarly, the compartment space 187 can be at least partially defined between the divider wall 179, the divider wall 181, the hinge panel 127 and a respective portion of the bottom wall B of the container C, and a respective portion of the sidewall S of the container C. The compartment space 189 can be at least partially defined between the divider wall 181, the divider wall 183, the hinge panel 123 and a respective portion of the bottom wall B of the container C, and a respective portion of the sidewall S of the container C. It will be understood that the compartment spaces can be differently arranged in the container C without departing from the disclosure.

In this regard, the construct 105 can be provided separately from containers C or other containers to provide an optional divider insert for an existing supply of containers, e.g., for use in situations in which a compartmented interior for a given container is desired. In some embodiments, the construct(s) 105 can be provided together with containers C or other systems as a kit or package for forming compartmented containers (e.g., the system 110).

It will be understood that the construct 105, the container C, and/or one or more respective features thereof can have a different arrangement or configuration without departing from the disclosure.

It will be understood that blanks and containers according to the present disclosure can have a different number, arrangement, and/or configuration of features without departing from the disclosure.

In general, the blanks described herein may be constructed from paperboard having a caliper so that it is heavier and more rigid than ordinary paper. The blanks can also be constructed of other materials, such as cardboard, sheet plastics or any other material having properties suitable for enabling the container to function at least generally as described above. The blanks can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding thereealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the container embodiments. The term "glue" is intended to encompass all manner of adhesives commonly used to secure container panels in place, and is not intended to exclude heat, chemical, or frequency bonding techniques.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A construct for providing divider features in an interior of a container, the construct comprising:

a plurality of panels comprising a bottom panel, a first hinge panel foldably connected to the bottom panel, a second hinge panel foldably connected to the bottom panel, a first divider panel foldably connected to the first hinge panel, and a second divider panel foldably connected to the second hinge panel; and divider features comprising a divider wall extending upwardly from the bottom panel, the divider wall comprising the first divider panel and the second divider panel in at least partial face-to-face contact.

2. The construct of claim 1, wherein at least one of the first hinge panel or the second hinge panel is in at least partial face-to-face contact with the bottom panel.

3. The construct of claim 2, wherein the plurality of panels further comprises a third hinge panel foldably connected to the bottom panel, a third divider panel foldably connected to the first hinge panel, and a fourth divider panel foldably connected to the third hinge panel, the divider wall is a first divider wall and the divider features further comprise a second divider wall extending upwardly from the bottom panel and comprising the third divider panel, and the divider features further comprise a third divider wall extending upwardly from the bottom panel and comprising the fourth divider panel.

4. The construct of claim 3, wherein the plurality of panels further comprises a fifth divider panel foldably connected to the second hinge panel and a sixth divider panel foldably connected to the third hinge panel, the second divider wall comprising the third divider panel and the sixth divider panel, and the third divider wall comprising the fourth divider panel and the fifth divider panel.

5. The construct of claim 4, wherein, the fourth divider panel is in at least partial face-to-face contact with the fifth divider panel, the third divider panel is in at least partial face-to-face contact with the sixth divider panel, the second hinge panel is in at least partial face-to-face contact with the bottom panel, and the third hinge panel is in at least partial face-to-face contact with the bottom panel.

6. The construct of claim 1, wherein the plurality of panels further comprises a third divider panel foldably connected to the first hinge panel.

7. The construct of claim 6, wherein the divider wall is a first divider wall and the divider features further comprise a second divider wall extending upwardly from the bottom panel, the second divider wall comprising the third divider panel.

8. The construct of claim 7, the plurality of panels further comprising an attachment end flap foldably connected to the first divider panel, the attachment end flap in at least partial face-to-face contact with the third divider panel.

9. The construct of claim 8, wherein the third divider panel comprises a base portion foldably connected to the first hinge panel and a distal portion foldably connected to the base portion, the attachment end flap in at least partial face-to-face contact with the distal portion of the third divider panel.

10. A blank for forming a construct for providing divider features in an interior of a container, the blank comprising:

a plurality of panels comprising a bottom panel, a first hinge panel foldably connected to the bottom panel, a second hinge panel foldably connected to the bottom panel, a first divider panel foldably connected to the first hinge panel, and a second divider panel foldably connected to the second hinge panel; and divider features for forming a divider wall extending upwardly from the bottom panel when the construct is formed from the blank, the divider wall comprising the first divider panel and the second divider panel in at least partial face-to-face contact when the construct is formed from the blank.

11. The blank of claim 10, wherein the plurality of panels further comprises a third divider panel foldably connected to the first hinge panel.

12. The blank of claim 11, wherein the divider wall is a first divider wall for being formed from the divider features when the construct is formed from the blank and the third divider panel is for forming a second divider wall extending upwardly from the bottom panel when the construct is formed from the blank.

13. The blank of claim 12, the plurality of panels further comprising an attachment end flap foldably connected to the first divider panel, the attachment end flap being positioned in at least partial face-to-face contact with the third divider panel when the construct is formed from the blank.

14. The blank of claim 13, wherein the third divider panel comprises a base portion foldably connected to the first hinge panel and a distal portion foldably connected to the base portion, the attachment end flap for being positioned in at least partial face-to-face contact with the distal portion of the third divider panel when the construct is formed from the blank.

15. The blank of claim 10, wherein the plurality of panels further comprises a third hinge panel foldably connected to the bottom panel, a third divider panel foldably connected to the first hinge panel, and a fourth divider panel foldably connected to the third hinge panel, the divider wall is a first divider wall for being formed from the divider features when the construct is formed from the blank, the second-third divider panel is for forming a second divider wall extending upwardly from the bottom panel when the construct is formed from the blank, and the fourth divider panel is for forming a third divider wall extending upwardly from the bottom panel when the construct is formed from the blank.

16. The blank of claim 15, wherein the plurality of panels further comprises a fifth divider panel foldably connected to the second hinge panel and a sixth divider panel foldably connected to the third hinge panel, the third divider panel and the sixth divider panel for forming the second divider wall when the construct is formed from the blank, the fourth divider panel and the fifth divider panel for forming the third divider wall when the construct is formed from the blank.

17. A method of forming a construct for providing divider features in an interior of a container, the method comprising:
- obtaining a blank, the blank comprising a plurality of panels comprising a bottom panel, a first hinge panel foldably connected to the bottom panel, a second hinge panel foldably connected to the bottom panel, a first divider panel foldably connected to the first hinge panel, and a second divider panel foldably connected to the second hinge panel, and divider features comprising the first divider panel and the second divider panel; and
- positioning the divider features to form a divider wall extending upwardly from the bottom panel, wherein the first divider panel and the second divider panel are in at least partial face-to-face contact.

18. The method of claim 17, further comprising positioning the at least one-first hinge panel or the second hinge panel in at least partial face-to-face contact with the bottom panel.

19. The method of claim 18, wherein the plurality of panels further comprises a third hinge panel foldably connected to the bottom panel, a third divider panel foldably connected to the first hinge panel, and a fourth divider panel foldably connected to the third hinge panel, the divider wall is a first divider wall and the method further comprises forming a second divider wall extending upwardly from the bottom panel and comprising the third divider panel and forming a third divider wall extending upwardly from the bottom panel and comprising the fourth divider panel.

20. The method of claim 19, wherein the plurality of panels further comprises a fifth divider panel foldably connected to the second hinge panel and a sixth divider panel foldably connected to the third hinge panel, the second divider wall comprising the third divider panel and the sixth divider panel, and the third divider wall comprising the fourth divider panel and the fifth divider panel.

21. The method of claim 20, comprising positioning the fourth divider panel in at least partial face-to-face contact with the fifth divider panel, positioning the third divider panel in at least partial face-to-face contact with the sixth divider panel, positioning the second hinge panel in at least partial face-to-face contact with the bottom panel, and positioning the third hinge panel in at least partial face-to-face contact with the bottom panel.

22. The method of claim 17, wherein the plurality of panels further comprises a third divider panel foldably connected to the first hinge panel.

23. The method of claim 22, wherein the divider wall is a first divider wall and the method further comprises forming a second divider wall extending upwardly from the bottom panel, the second divider wall comprising the third divider panel.

24. The method of claim 23, wherein plurality of panels of the blank further comprises an attachment end flap foldably connected to the first divider panel, and the method further comprises positioning the attachment end flap in at least partial face-to-face contact with the third divider panel.

25. The method of claim 24, wherein the third divider panel comprises a base portion foldably connected to the first hinge panel and a distal portion foldably connected to the base portion, the method further comprises positioning the attachment end flap in at least partial face-to-face contact with the distal portion of the third divider panel.

26. A system, the system comprising:
- a container comprising a bottom wall and a sidewall extending upwardly from the bottom wall and at least partially around an interior of the container; and
- a construct for providing divider features in the interior of the container, the construct comprising:
  - a plurality of panels comprising a bottom panel, a first hinge panel foldably connected to the bottom panel, a second hinge panel foldably connected to the bottom panel, a first divider panel foldably connected to the first hinge panel, and a second divider panel foldably connected to the second hinge panel; and
  - divider features comprising a divider wall extending upwardly from the bottom panel and comprising the first divider panel and the second divider panel in at least partial face-to-face contact.

27. The system of claim 26, wherein the first hinge panel or the second hinge panel is in at least partial face-to-face contact with the bottom panel.

28. The system of claim 27, wherein the plurality of panels further comprises a third hinge panel foldably connected to the bottom panel, a third divider panel foldably connected to the first hinge panel, and a fourth divider panel foldably connected to the third hinge panel, the divider wall is a first divider wall and the divider features further comprise a second divider wall extending upwardly from the bottom panel and comprising the third divider panel, and the divider features further comprise a third divider wall extending upwardly from the bottom panel and comprising the fourth divider panel.

29. The system of claim 28, wherein the plurality of panels further comprises a fifth divider panel foldably connected to the second hinge panel and a sixth divider panel foldably connected to the third hinge panel, the second divider wall comprising the third divider panel and the sixth divider panel, and the third divider wall comprising the fourth divider panel and the fifth divider panel.

30. The system of claim 29, wherein the the fourth divider panel is in at least partial face-to-face contact with the fifth divider panel, the third divider panel is in at least partial face-to-face contact with the sixth divider panel, the second hinge panel is in at least partial face-to-face contact with the bottom panel, and the third hinge panel is in at least partial face-to-face contact with the bottom panel.

31. The system of claim 27, wherein the divider wall forms a plurality of compartments in the interior of the container.

32. The system of claim 26, wherein the the plurality of panels further comprises a third divider panel foldably connected to the first hinge panel.

33. The system of claim 32, wherein the divider wall is a first divider wall and the divider features further comprise a second divider wall extending upwardly from the bottom panel, the second divider wall comprising the third divider panel.

34. The system of claim 33, the plurality of panels further comprising an attachment end flap foldably connected to the first divider panel, the attachment end flap in at least partial face-to-face contact with the third divider panel.

35. The system of claim 34, wherein the third divider panel comprises a base portion foldably connected to the first hinge panel and a distal portion foldably connected to the base portion, the attachment end flap in at least partial face-to-face contact with the distal portion of the third divider panel.

* * * * *